Figure 4:
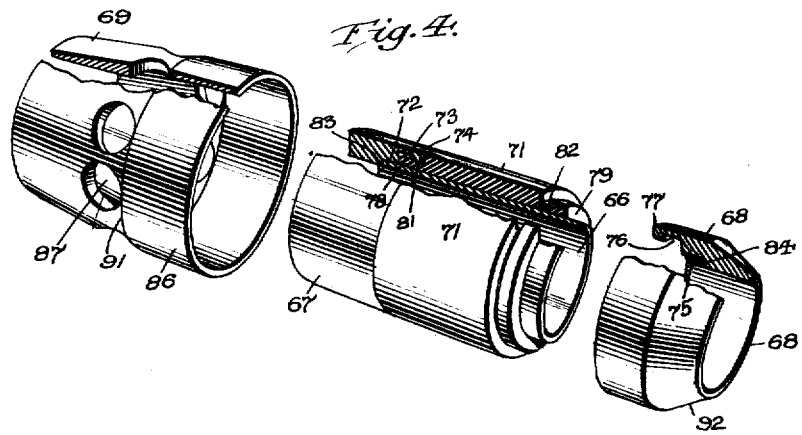

Nov. 8, 1932.  J. R. HOFFMAN  1,886,546
GOVERNOR FOR FLUID MOTORS
Filed Oct. 10, 1931   2 Sheets-Sheet 1
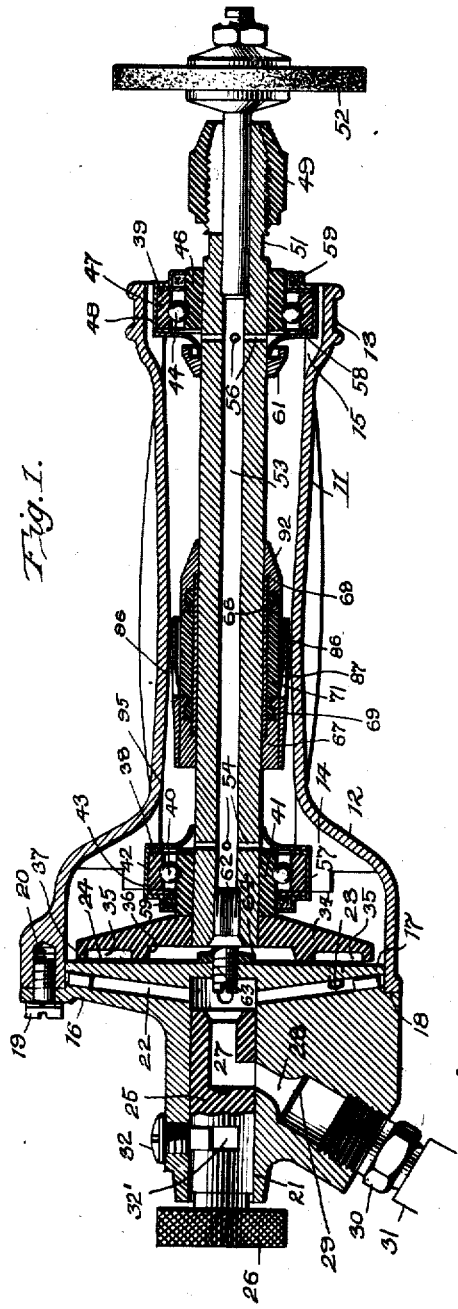
Fig. 1.
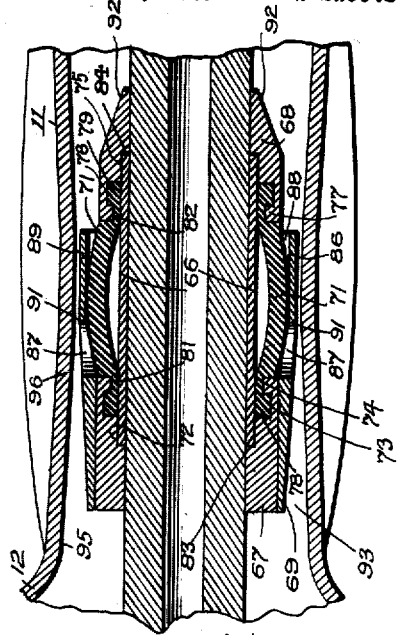
Fig. 2.
Fig. 3.
Inventor
John R. Hoffman,
By Dodge and Sons
Attorneys.

Nov. 8, 1932.    J. R. HOFFMAN    1,886,546
GOVERNOR FOR FLUID MOTORS
Filed Oct. 10, 1931    2 Sheets-Sheet 2

Inventor:
John R. Hoffman,

By Dodge

Attorneys.

Patented Nov. 8, 1932

1,886,546

UNITED STATES PATENT OFFICE

JOHN R. HOFFMAN, OF MADISON, WISCONSIN, ASSIGNOR TO MADISON-KIPP CORPORATION, OF MADISON, WISCONSIN, A CORPORATION OF WISCONSIN

GOVERNOR FOR FLUID MOTORS

Application filed October 10, 1931. Serial No. 568,151.

This invention relates to governors for fluid motors, and more particularly to means for governing the speed of rotary, pneumatic tools, such as grinders and the like.

The primary purpose of the invention is to provide improved governing means for controlling efficiently the operation of the motor, whereby it may be limited to a desired speed. This is particularly advantageous in high speed, pneumatic grinders, employing turbines, wherein a definite speed of operation of the turbine and its driving spindle has been found to give particularly satisfactory results. In addition, such governing means serve to prevent racing of the tool and possible breakage resulting therefrom.

An important object of the invention, especially in its application to high speed, turbine-driven grinders, is the designing of a governor which is extremely sensitive, so as to be effective upon a comparatively small change in speed. Thus, the governor permits the tool to operate under service conditions at a certain maximum high speed, but becomes effective to throttle the flow of air and slow down the tool upon a small increment of speed over the maximum. Special means are included in the governing mechanism for protecting it against wear or other damage, and thereby insuring proper functioning of the governor at all times. Provision is made also for ready and accurate adjustment of the governing means to vary the maximum speed of the turbine, when desired.

A further feature is the functioning of the governor as a valve which controls escape of exhaust fluid from the turbine, and thereby directly regulates operation of the latter. The governor is of simple, inexpensive construction and is designed particularly for operation in a small space without loss in efficiency of operation. It is readily mounted and adjusted on the turbine spindle and detached therefrom as a self-contained unit.

Other objects and advantages of the invention will appear from the detailed description given below when read in connection with the accompanying drawings, wherein:—

Figure 5:
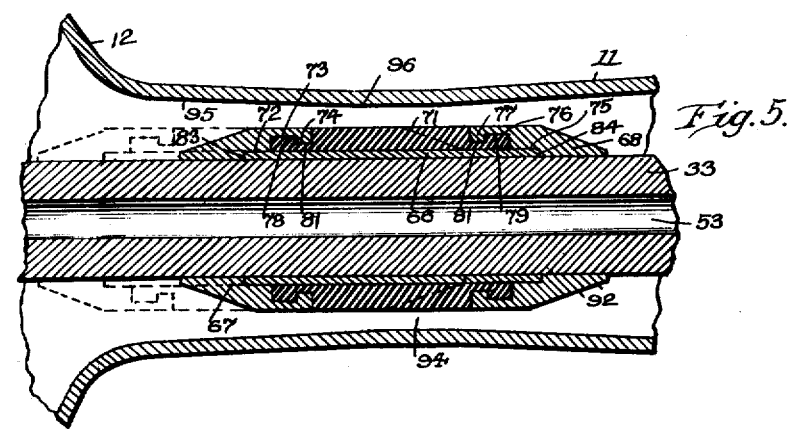
Figure 6:
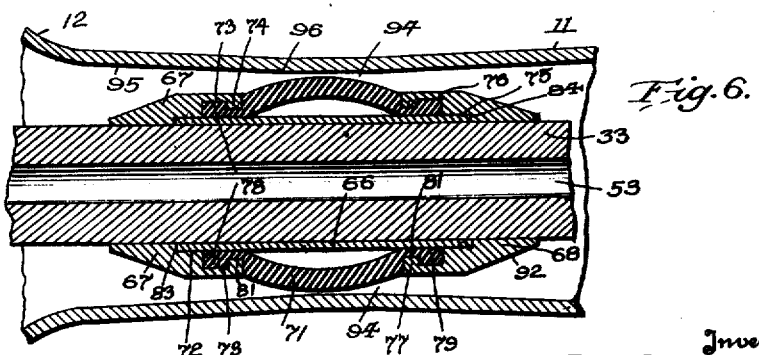

Fig. 1 is a longitudinal section of one type of fluid pressure tool embodying the preferred form of the invention, the governor being shown in the normal, inoperative position which it maintains as long as the speed of the tool is not in excess of the maximum speed for which the governor is designed;

Fig. 2, a similar, fragmentary view, enlarged to show the details of the governor with the parts in the same position;

Fig. 3, a similar view showing the governor in the extreme operative position which it assumes to throttle the turbine, when the latter exceeds its predetermined maximum speed;

Fig. 4, a perspective of the governor proper, certain of the parts thereof being disassembled to show the details of construction;

Fig. 5, a view, similar to Fig. 2, of a modified form of the invention, the governor being in its inoperative position; and Fig. 6, a similar view thereof, the governor appearing in its operative position.

In the drawings, the invention is illustrated as applied to a high-speed, pressure-fluid operated grinder of the general type covered by the pending applications of John R. Hoffman, Serial No. 419,417, filed January 8, 1930, and Serial No. 548,245, filed July 1, 1931; and that of Axel Pedersen, Serial No. 563,202, filed September 16, 1931. No claim is made herein to such features of construction and operation of the tool as are covered by these applications, but only to the improvements hereinafter pointed out.

As shown, the grinder comprises a tool casing consisting of a barrel 11 formed with a large head portion 12 at its inner end and a smaller head portion 13 at its opposite end.

Located within head portion 12 and formed integrally with the tool casing are a plurality of inwardly projecting, radial ribs 14. The smaller head portion 13 of the casing also is formed with a similar set of radial ribs 15, the purpose of the two sets of ribs being to receive and support properly in axial alinement certain rotor shaft bearings as explained hereinafter.

A plug-type closure 16, provided with a reduced inner portion 17, is located in the open end of head portion 12, its inward movement being limited by shoulder 18. The closure is secured in place by screw 19 extending through the closure and into a threaded recess 20 in the end of head portion 12 of the casing.

Closure 16 is provided with an axial bore 21 which connects at its forward end with a plurality of radial ducts 22 terminating in ports 23 (only one of which is shown) on the inner face 24 of the closure. A pressure-fluid control valve 25, provided with an adjusting knob 26 is rotatably mounted in bore 21. Valve 25 has an axial passage 27 therein which opens at one end into the forward portion of bore 21. At its rear end passage 27 opens laterally for registry with a pressure-fluid inlet duct 28 when the tool is to be operated. A suitable air strainer 29 is located in duct 28, while a nipple 30, to which a hose 31 is attached, is threaded into the outer end of duct 28.

A set screw 32 projects into bore 21 of closure 16, as shown in Fig. 1, and coacts with a cross groove 32' in valve 25 to prevent removal of the valve and to limit rotary movement thereof in both directions. In the position of the parts shown, stop 32 engages one end of groove 32' and inlet duct 28 communicates with passage 27 to deliver pressure-fluid to radial passages 22. When knob 26 is rotated in the opposite direction until stop 32 engages the other end of groove 32', inlet port 28 is blanked by the stem of valve 25 and passage of pressure-fluid to duct 27 and radial passages 22 is prevented. Obviously by suitable manipulation of knob 26, valve 25 may be moved into intermediate positions, thereby delivering varying amounts of pressure-fluid to passage 27.

Mounted for rotation within the tool casing proper is a rotor consisting of a shaft or spindle 33 and a runner 34 attached to the inner end of the shaft. Runner 34 has a plurality of radial buckets 35 formed on one face thereof and extending between inner and outer flanges 36, 37, the buckets 35 being operatively arranged relative to outlet ports 23 in closure 16, as shown in Fig. 1.

In order to obtain maximum driving power from the pressure-fluid acting on runner 34, it has been found important to reduce to a minimum the operating clearances between face 24 of the closure and flanges 36, 37 of the runner. In this manner, pressure-fluid impinging upon the runner buckets from ports 23 is prevented by inner flange 36 from escaping towards the axis of the runner, but, after exhausting substantially all of its kinetic energy in actuating the runner, escapes between outer flange 37 and the face of closure 16. The restricted, annular exhaust passage formed by these parts tends to throttle the flow of fluid from between runner 34 and the opposed face of closure 16. Thus, the pressure-fluid is retained between rims 36, 37 for a longer period and full and complete use is made of its velocity head to operate the runner. It will be noted that the fluid, after acting on the runner, escapes uniformly about the periphery thereof; also, that there are no exhaust ports located between the operating face of the runner and closure 16.

Shaft or spindle 33 is rotatably mounted in a pair of anti-friction bearings 38, 39. Balls 40 of inner bearing 38 cooperate with inner ball race 41, secured to shaft 33, and an outer race 42, supported in notches 43 formed in ribs 14. Similarly, balls 44 of outer bearing 39 coact with races 46 and 47, the latter being supported in notches 48 in ribs 15.

Shaft 33 is split at its outer end and is threaded to receive a nut, thereby forming a chuck or tool-holding socket 49. It is flattened at 51 to receive a wrench, when a mounted grinder wheel 52 or other suitable tool element is being clamped in the chuck.

In order to lubricate bearings 38, 39 properly, shaft 33 is formed with a lubricant-containing chamber 53. A rear set of radial ducts 54 and a front set of similar ducts 56 lead from chamber 53 into bearings 38, 39, respectively, so as to supply oil thereto from chamber 53 as a result of the centrifugal force acting upon the lubricant, when the tool is in operation. Lubricant is supplied to passage 53 from the outer end of shaft 33 through the chuck before tool element 52 is clamped in place.

Both front and rear ball bearings 38, 39 are protected by air deflecting washers 57, 58, which prevent the compressed air from forcing the lubricant from the bearings. Each washer 57, in conjunction with washer 58, forms a space to receive an annular felt packing 59. Pressure-fluid is also prevented from passing through outer bearing 39 by an annular deflector 61 fixed on shaft 33 just to the rear of this bearing.

A rivet 62 closes the inner end of lubricant chamber 53 in the grinder spindle. The rivet coacts with an adjustable screw 63 to form a thrust bearing for spindle 33. Screw 63 is threaded through face 24 of closure 16 and is accessible for adjustment through bore 21 when valve 25 is removed. A lock nut 64 serves to secure screw 63 in any desired adjusted position.

In operation, a source of pressure fluid having been connected to hose 31, pressure fluid will enter passage 27 when valve 25 is moved to the position of Fig. 1. It then passes into radial ducts 22 and escapes from equally spaced ports 23, striking the blades of runner 34 and setting the rotor in motion. After expending its force on the blades of the runner, the fluid escapes around the outer flange 37 into the chamber in head 12. The exhaust fluid then passes into cooling contact with the exterior of ball bearing 40 and between ribs 14 into the annular space between shaft 33 and barrel 11 of the casing. Thence, the fluid is exhausted to the atmosphere through the spaces between ribs 15 surrounding ball bearing 39.

The above-described features of construction and operation are fully covered by the pending applications of John R. Hoffman and Axel Pedersen hereinbefore mentioned. The means for governing the speed of operation of the rotor and its attached parts, which forms the subject matter of the present invention, will be described now.

The governor is fixed on shaft or spindle 33 and is adapted to rotate with the shaft in barrel 11. The preferred form of the governor appears in Figs. 1 to 4. As shown, it comprises an inner metal sleeve 66, a pair of metal collars 67, 68 fixed on the ends thereof, an outer metal sleeve 69 fixed on collar 67, and an intermediate rubber sleeve 71 secured only at its ends to sleeve 66 by collars 67, 68. These parts, forming the governor, are mounted as an assembled unit on shaft 33 intermediate ball bearings 38, 39 before deflector 61 and the other parts are located on the outer end of the shaft.

The governor unit is pressed securely into place on shaft 33, whereby it is made to rotate therewith, the alined central openings through sleeve 66 and collars 67, 68, which are of the same diameter, being properly dimensioned for this purpose.

The details of construction of the governor are shown best in Fig. 4. Collar 67 is enlarged internally at 72 to receive one end of inner sleeve 66, the parts being pressed together so as to secure them against relative movement. Collar 67 is formed internally also with an annular groove 73 and an adjoining, annular rib or tongue 74, the purpose of which will appear shortly.

Collar 68 is secured on the opposite end of sleeve 66 similarly to collar 67, the collar being enlarged internally at 75 to receive the sleeve, which is forced tightly therein. Likewise, collar 68 is provided internally with an annular groove 76 and an adjoining annular rib 77.

Rubber sleeve 71, which forms the active governor member of the assembly, fits snugly about the central portion of metal sleeve 66, but as stated, is secured to the unit only at its ends by collars 67, 68. This is shown particularly clearly in the operative position of the governor in Fig. 3. The ends of rubber sleeve 71 project between inner sleeve 66 and the spaced inner end portions of collars 67, 68, where they are provided with annular ribs 78, 79 and adjoining annular grooves 81, 82, which interlock with the corresponding annular ribs and grooves on the collars 67, 68.

In practice, the governor unit is assembled partly by first pressing collars 67, 68 firmly into place on the ends of sleeve 66 until they abut shoulders 83, 84 in the collars. Rubber sleeve 71 is then molded in place around the central portion of sleeve 66. The rubber sleeve preferably is made sufficiently thick to locate its outer surface substantially flush with the outer surfaces of collars 67, 68.

During the molding operation just mentioned, the rubber is forced to flow into the annular spaces between sleeve 66 and the inner ends of collars 67, 68, thereby forming the grooved and ribbed ends of the rubber sleeve which interlock with the collars. Inner sleeve 66 being of steel, the rubber sleeve thus formed does not adhere tightly thereto. Consequently, the central portion of rubber sleeve 71 is free to stretch and move outwardly, because of the centrifugal force, when shaft 33 revolves at an excessive speed.

Outer metal sleeve 69, which is pressed into place on collar 67 so as to rotate with the governor unit, is enlarged at its forward end to form an annular shroud 86 surrounding the free central portion of rubber sleeve 71. At its inner end shroud portion 86 is provided with an annular series of openings 87 through which exhaust air from the turbine normally passes from the space between barrel 11 and sleeve 69 into the space 88 between the shroud and rubber sleeve 71. The part of shroud 86 in which openings 87 are located is tapered interiorly so as to form an annular, tapered seat for rubber sleeve 71, when the latter is performing its governing or throttling function, as illustrated in Fig. 3. The outer end of shroud 86 preferably is cylindrical and of uniform thickness, while its outside diameter is such as to leave an annular space 89 between the shroud and barrel 11.

Exteriorly sleeve 69 is tapered from a point 91 at the forward edges of openings 87 to the inner end of the sleeve, so as to interfere as little as possible with the passage of pressure fluid through and past the governor. The forward end of collar 68 is tapered at 92 for the same purpose.

In the operation of the tool, the governor functions as follows. Exhaust motive fluid from turbine runner 34 passes into barrel 11 and flows normally both around and through the governor unit on its way to the exhaust outlet at the outer end of the casing. The stream of exhaust fluid is divided upon entering the annular space 93 between outer sleeve 69 and the tool casing, the bulk of the fluid passing by way of openings 87 through space 88, between outer sleeve 69 and rubber sleeve 71, while the remainder passes through annular space 89, between outer sleeve 69 and the casing.

In practice, annular space 89 serves merely as an operating clearance between protector sleeve 69 and the casing. Consequently, this space is slight and permits the passage therethrough of only a small amount of exhaust fluid. On the other hand, annular space 88 is much larger, so as to permit free passage of exhaust fluid from the turbine runner and operation of the grinder spindle at full operating speed.

Sleeve 71 of the governor is made of specially cured rubber and all of the parts of the governor are properly dimensioned and arranged relatively to each other and to the tool casing, so that the spindle and the attached governor unit may revolve up to a predetermined maximum speed without the governor functioning to cut down the speed of the spindle. However, as soon as spindle 33 exceeds this maximum speed, the increased centrifugal force imparted to rubber sleeve 71 causes the central free portion thereof to expand or stretch, thereby gradually cutting down and finally closing off entirely annular space 88 when the rubber sleeve contacts with the interior of protector sleeve 69, as shown in Fig. 3. The expansion of rubber sleeve 71 also effectively seals the annular series of openings 87 in the protector sleeve and passage of exhaust fluid beyond the governor is prevented, except for the small amount that escapes through clearance space 89. This is insufficient to drive the rotor at a suitable operating speed.

As a result of this throttling or valve action of sleeve 71, the passage of motive fluid through the turbine runner is retarded, thereby slowing up operation of the runner and cutting down the speed of the spindle 33 to or below its maximum. Concurrently with this reduction in speed of spindle 33, and consequently in the centrifugal force imparted to rubber sleeve 71, the sleeve resumes its normal cylindrical shape of Fig. 2 and thereby permits the free passage of exhaust fluid into openings 87 and through annular space 88. Governor valve or sleeve 71 is then in position to function again to throttle the exhaust outlet of the rotor and reduce the speed of the spindle as soon as it exceeds its maximum.

Outer sleeve 69 serves not only to limit the expanding action of rubber sleeve 71, but also protects the sleeve from possible damage, particularly such harmful wear thereon as would be occasioned were the rapidly rotating rubber sleeve permitted upon expanding to come into contact with any stationary part, such as the interior of the casing, or with some part rotating at a different speed. Since outer sleeve 69 is rotating at the same speed as is rubber sleeve 71, both sleeves being driven by spindle 33, there is no relative rotative movement between these parts at any time. Consequently, there is no chance of harmful rubbing action of one part on the other, when, in operation, the rubber sleeve expands against the interior of the protector sleeve. The parts of the governor simply rotate together as a unit at all times.

The presence of protector sleeve 69 is particularly advantageous in cases where spindle 33 is operating at full speed and the motive fluid supply is shut off suddenly at valve 25. There being insufficient fluid pressure in the casing at this time to resist the expanding tendency of rubber sleeve 71, such tendency, in the absence of protector sleeve 69, would result in expansion of the rubber sleeve until it contacted with the casing, thereby damaging the rubber sleeve. With the protector sleeve in place, sudden cutting off of the fluid merely results in the rubber sleeve expanding against the interior of protector sleeve 69 and these parts rotating together as a unit. Hence, the rubber valve sleeve 71 is not damaged.

The modified form of the governing device shown in Figs. 5 and 6 is the same as the preferred form above-described, except for the omission of the protector sleeve 69. This form of the device has been used, but not with the highly satisfactory results obtained with the protector sleeve form. The normal or inoperative position of the parts of the modified device is shown in Fig. 5. With this arrangement, there is provided a single annular space 94 for the passage of exhaust fluid between rubber sleeve 71 of the governor device and the tool casing. Until the maximum speed of rotation of spindle 33 is exceeded, rubber sleeve 71 remains in the position shown, so as to permit free passage of exhaust fluid from runner 34 through annular passage 94 and thereby enable the spindle to operate at full speed. However, upon a small increment of speed over the maximum for which the parts are designed and set, centrifugal force acts upon the free portion of rubber sleeve 71 to expand it towards the interior of the casing, as shown in Fig. 6. This immediately throttles the flow of exhaust fluid through the casing, thereby slowing up operation of the runner and restoring the speed of spindle 33 to or below its maximum. Concurrently, rubber sleeve 71 automatically resumes its original form of Fig. 5, ready for subsequent operations whenever the maximum speed of the spindle is exceeded.

The modified device has provision for adjustment, whereby the maximum speed at which the governor operates may be varied to suit different operating conditions. As appears from Figs. 5 and 6, barrel 11 of the tool casing is formed with a tapered portion 95, the smallest part of which is located at 96. In full lines, the governor unit is shown located so that rubber sleeve 71 is within the smallest part 96 of the barrel. However, since the governor unit is pressed into place on spindle 33, the unit may be forced to the left on the spindle, as shown in dotted lines in Fig. 5, thereby bringing the unit into the larger part of the tapered portion of the barrel. This obviously increases the size of the annular space 94 between the casing and rubber sleeve 71. Consequently, with the unit in the dotted line position of Fig. 5, the expansion of rubber sleeve 71 will have to be greater than it would in the full line position in order to throttle the flow of exhaust fluid through space 94 and thereby reduce the speed of the spindle. Hence, in the dotted line position of the governor unit, the spindle must operate at a higher speed to cause the greater expansion of the rubber sleeve necessary in this position for performance of its speed reducing function.

It is obvious that the governor unit may be adjusted relatively to tapered portion 95 of the casing, so as to provide for any desired maximum speed of the spindle, exceeding which the governor will function to restore the parts to their normal rate of operation.

Experience has shown that by careful dimensioning of the parts of the governor unit, and also by proper adjustment of the unit on the spindle in the case of the modified form of Figs. 5 and 6, the speed of the spindle may be maintained constantly within an extremely small percentage of the desired speed. This is true, even though the pressure head of the motive fluid supply varies considerably.

The governor device being in the form of a self-contained unit pressed onto the spindle, its removal from the spindle and replacement or adjustment thereon is a very simple matter. With this unitary construction, possible misplacement of parts is avoided. The integral parts are few in number and, being cheap to manufacture, the initial cost of the device and of replacements therefor is low. Forming the active governor member, viz. sleeve 71, of rubber or its equivalent has been found highly advantageous, particularly because of the adaptability of a governor valve of this material to function efficiently even though of small size.

While the governor device has been illustrated and specifically described with reference to a certain type of tool, including a fluid pressure motor, the invention obviously is applicable to fluid motors of other types. Although the preferred embodiment of the invention and a modified form thereof is herein shown and described, it also is obvious that changes may be made in the details thereof without departing from the spirit and scope of the invention, except as the same may be limited by the appended claims.

What is claimed is:—

1. The combination of a casing adapted for the passage of fluid therethrough; a shaft mounted for rotation in said casing; and a valve mounted on said shaft for rotation therewith, said valve including a rubber portion stretchable by centrifugal force to control the flow of fluid through the casing.

2. The combination of a casing adapted for the passage of fluid therethrough; a shaft mounted for rotation in said casing; and a valve mounted on said shaft for rotation therewith, said valve consisting of an imperforate, resilient portion shiftable by centrifugal force to control the flow of fluid through the casing.

3. The combination of a casing having an inlet port and an exhaust port; a rotor; and a stretchable rubber governor member located in the casing between said ports and driven by the rotor, said member being responsive to speed changes and acting as a centrifugal speed governor and regulating valve to control the amount of motive fluid passing through the rotor.

4. The combination of a casing having inlet and exhaust ports; a rotor mounted for operation in said casing; and a stretchable rubber governor valve located in the casing and driven by the rotor, said governor valve being deformable by centrifugal force to control the passage of motive fluid from the rotor to the exhaust port.

5. A rotary governor valve adapted for use in a fluid conducting casing, said valve including a stretchable rubber portion deformable by centrifugal force to control the flow of fluid through the casing.

6. A rotary governor valve unit adapted for use in a fluid conducting casing, said valve unit comprising a supporting member and a rubber sleeve mounted thereon and secured to the supporting member only at its ends, the intermediate free portion of the rubber sleeve being deformable by centrifugal force to control the flow of fluid through the casing.

7. A rotary governor valve unit adapted for use in a fluid conducting casing, said valve unit comprising a metal sleeve, a rubber sleeve mounted on the metal sleeve, and a pair of metal collars fixed to the metal sleeve and connecting the rubber sleeve to the metal sleeve only at its ends, the intermediate, free portion of the rubber sleeve being expansible by centrifugal force to control the flow of fluid through the casing.

8. A rotary governor valve unit for use in a fluid conducting casing, said valve unit being adapted for mounting upon a rotating member in the casing and including a resilient portion deformable by centrifugal force to control the flow of fluid through the casing, and means, other than said rotating member, rotatable with the unit for preventing engagement of said resilient portion of the valve unit with the casing.

9. A rotary governor valve unit for use in a fluid conducting casing, said unit comprising a supporting member, a rubber member mounted on and secured to the supporting member for rotation therewith, a portion of said rubber member being free from the supporting member and deformable by centrifugal force to control the flow of fluid through the casing; and means carried by the unit for limiting the deformation of the rubber member.

10. A rotary governor valve unit for use in a fluid conducting casing, said unit comprising an inner rigid sleeve, an intermediate rubber sleeve secured only at its ends to said inner sleeve, the intermediate portion of the rubber sleeve being deformable by centrifugal force to control the flow of fluid through the casing, and an outer, rigid sleeve supported at one end by the unit and forming a shroud at its opposite end surrounding the intermediate portion of the rubber sleeve in spaced relation thereto, the space so formed being open at its outer end and communicating at its inner end with an annular series of openings in the shroud.

11. The combination of a casing having an inlet port and an exhaust port; a rotor; a rotary governor valve interposed between said ports and driven by said rotor, said governor valve being responsive to speed changes and deformable to control the amount of motive fluid passing through the rotor; and means for limiting the deformation of the governor valve so as to permit a quantity of motive fluid to flow through the rotor at all times.

12. In combination, a casing having inlet and exhaust ports; a rotor; a rotating member driven by the rotor; a governor valve located between said ports and attached to said rotating member, said governor valve including a resilient portion expansible by centrifugal force to restrict the flow of exhaust fluid from the rotor to the exhaust port; and means, other than said rotating member, rotatable with the governor valve to limit the expansion of said resilient portion.

13. The combination of a casing having a passageway of varying cross section through which fluid is adapted to flow; and a rotary governor valve located in said passageway and deformable by centrifugal force to control the flow of fluid therethrough, said governor valve being adjustable to vary the cross sectional area of the normal flow path of the fluid through the casing.

14. The combination of a casing adapted for the passage of fluid therethrough, and a rotary valve in said casing, said valve including a resilient, cylindrical portion adapted to be expanded by centrifugal force to restrict the flow of fluid through the casing.

15. In a device of the character described, the combination of a turbine rotor, including a runner and a shaft; a casing for the rotor, said casing being provided with inlet and outlet ports; and a governor valve mounted on and secured to said shaft for rotation therewith, said valve including a rubber sleeve secured only at its ends to the shaft, the intermediate, free portion of the sleeve being expansible by centrifugal force to restrict the flow of motive fluid through the runner.

16. In a device of the character described, the combination of a turbine rotor, including a runner and a shaft therefor; a casing for the rotor having inlet and outlet ports for motive fluid; and a governor valve on said shaft between the runner and the exhaust port, said valve comprising an inner sleeve secured to the shaft, a rubber sleeve mounted on the inner sleeve, collars connecting only the ends of the rubber sleeve to the inner sleeve, and an outer sleeve fixed on one of said collars and having an annular shroud portion surrounding in spaced relation the intermediate free portion of the rubber sleeve to limit the expansion thereof by centrifugal force, said shroud portion being formed internally with a tapered valve seat having an annular series of openings with which said free portion of the rubber sleeve is adapted to coact with regulating passage of motive fluid between the shroud and the rubber sleeve.

17. In a governor for fluid motors, the combination of a casing having a head portion and a barrel portion; a turbine runner in said head portion; a spindle for the runner journaled in the barrel portion, said head portion being provided with a motive fluid inlet and said barrel portion with an outlet for exhaust fluid; and a governor valve mounted on said spindle between the runner and the exhaust outlet, said valve being adapted to rotate with the spindle and including a rubber sleeve having a free portion shiftable by centrifugal force upon excessive speed of rotation of the spindle to restrict the flow of exhaust fluid between the valve and the casing to the fluid outlet.

18. In a governor for pressure fluid actuated motors, the combination of a tubular casing through which motive pressure fluid flows; a shaft arranged to be driven by a governed motor and extending coaxially through said tubular casing; a member fixed on said shaft to rotate therewith and substantially filling the annular interval between the shaft and casing, said member being ported to permit passage of the major portion of said fluid therethrough; and means also mounted on said shaft to turn therewith and adapted to be flexed by centrifugal force to obstruct passage of fluid through said ported member.

19. The combination of claim 18 further characterized in that the ported member is in the form of a sleeve having an annular shroud portion surrounding the shaft in spaced relation thereto and provided with an annular series of ports for passage of said fluid therethrough.

20. The combination of claim 18 further characterized in that said ported member is in the form of a sleeve having a body portion at one end closely embracing the shaft and provided at its opposite end with an annular shroud surrounding the shaft in spaced relation thereto, the outer end of the shroud being arranged for operation in closely spaced relation to said casing, while the shroud is provided intermediate its outer end and the body portion with an annular series of ports for passage of said fluid therethrough, and the flexible means are arranged within said shroud portion for direct engagement with the ports.

21. The combination of a casing adapted for the passage of fluid therethrough; a shaft mounted for rotation in said casing; and a valve mounted on said shaft for rotation therewith, said valve including an elastic portion adapted to be stretched by centrifugal force to control the flow of fluid through the casing.

In testimony whereof I have signed my name to this specification.

JOHN R. HOFFMAN.

CERTIFICATE OF CORRECTION.

Patent No. 1,886,546.  November 8, 1932.

JOHN R. HOFFMAN.

It is hereby certified that error appears in the printed specification of the above numbered patent requiring correction as follows: Page 6, line 88, claim 16, for "with" read "for"; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.

and provided at its opposite end with an annular shroud surrounding the shaft in spaced relation thereto, the outer end of the shroud being arranged for operation in closely spaced relation to said casing, while the shroud is provided intermediate its outer end and the body portion with an annular series of ports for passage of said fluid therethrough, and the flexible means are arranged within said shroud portion for direct engagement with the ports.

21. The combination of a casing adapted for the passage of fluid therethrough; a shaft mounted for rotation in said casing; and a valve mounted on said shaft for rotation therewith, said valve including an elastic portion adapted to be stretched by centrifugal force to control the flow of fluid through the casing.

In testimony whereof I have signed my name to this specification.

JOHN R. HOFFMAN.

CERTIFICATE OF CORRECTION.

Patent No. 1,886,546.  November 8, 1932.

JOHN R. HOFFMAN.

It is hereby certified that error appears in the printed specification of the above numbered patent requiring correction as follows: Page 6, line 88, claim 16, for "with" read "for"; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.

CERTIFICATE OF CORRECTION.

Patent No. 1,886,546.                                          November 8, 1932.

JOHN R. HOFFMAN.

It is hereby certified that error appears in the printed specification of the above numbered patent requiring correction as follows: Page 6, line 88, claim 16, for "with" read "for"; and that the said Letters Patent should be read with this correction therein that the same may conform to the record of the case in the Patent Office.

Signed and sealed this 27th day of December, A. D. 1932.

M. J. Moore,

(Seal)                                                      Acting Commissioner of Patents.